United States Patent [19]

Smith, Jr.

[11] Patent Number: 4,942,083

[45] Date of Patent: Jul. 17, 1990

[54] ABRASION RESISTANT COATINGS

[76] Inventor: W. Novis Smith, Jr., 412 S. Perth St., Philadelphia, Pa. 19147

[21] Appl. No.: 194,110

[22] Filed: May 16, 1988

[51] Int. Cl.$^{5}$ .................................................. B32B 9/04

[52] U.S. Cl. .................................. 428/252; 427/407.1; 427/409; 428/285; 428/287; 428/411.1; 428/447; 428/457; 428/458; 428/480

[58] Field of Search ............... 428/252, 285, 287, 458, 428/411.1, 480, 457, 447; 427/407.1, 409

[56] References Cited

U.S. PATENT DOCUMENTS 4,284,682 8/1981 Factor ................................ 156/350

4,371,585 2/1983 Memon .............................. 428/341

*Primary Examiner*—Marion C. McCamish

*Attorney, Agent, or Firm*—John Lezdey

[57] ABSTRACT

A process for applying and adhering a silicone or siloxane based, abrasion-resistant coating to a metallized substrate comprising applying a primer coating comprising a member selected from the group consisting of a phosphorous containing acid, chromic acid and a lanthium salt dissolved in a suitable solvent, heating and then applying said abrasion-resistant coating.

15 Claims, No Drawings

ABRASION RESISTANT COATINGS

FIELD OF THE INVENTION

The present invention relates to metal film laminates which are used to prepare protective clothing and upholstery. More particularly, the invention is concerned with a means for protecting the outer layer of metallized substrates from abrasion and delamination by providing a protective transparent coating comprising polysiloxane or silicone.

BACKGROUND OF THE INVENTION

Protective clothing of many types is now well known of many and varied uses in protecting people from fire and harmful substances, such as suits for industrial workers, flame and fire resistant suits for fireman, forest fire fighters, race car drivers and airplane pilots, and suits for use by military personnel. Garments include not only complete, hermetic suits, but also individual garments such as trousers, jackets, gloves, boots, hats, head coverings, masks, etc.

Regulations restricting exposure to hazardous environments of various kinds, such as the Occupational Safety and Healt Act, make it increasingly necessary to have better and more effective kinds of protective garments.

Such garments presently available are almost invariably of thick construction and heavy in weight, and are often fabricated at least in part from materials impermeably to water or water vapor, such as natural and synethetic rubbers and elastomers, chlorinated rubbers, etc.

The use of aluminized film coated fabrics (AFCF) for fire proximity suits for firefighters depends on the ability of the surface of the resulting garment to reflect theradiant heat emitted from the fire. (About 75% of the heat or energy emitted from a flame source is radiant or infra red energy). The use of AFCF suits is highly effective, but the aluminum coating is soft and is abraded very readily, causing loss of protection in the abraded area, i.e., hot spots. There has been, and continues to be, a need for a suitable abrasion resistant coating for the AFCF suits that will not decrease the reflecting performance of the aluminum film. Such a film would increase the performance life of the suits and significantly reduce the effective costs of using these fire protective suits.

Two additional concerns besides the critical one of improving the abrasion resistance of the aluminum film are (1) the need to raise the service temperature of the substrate film from 400° F. to about 500° F. and (2) to improve the flexibility of the suit. Firefighters will continue to work as close to fires as they can and will be subject to direct flame excursions. The film will eventually be heated beyond its softening/melting point and the smooth aluminum surface is lost. The suit will rapidly become ineffective, endangering the firefighter. A higher service temperature film can provide a greater margin of safety for the user.

The stiffness and weight of the aluminized film plus the fabric make a fire-proximity suit physically tiring to wear. There is a need to improve the flexibility and lighten the weight of this suit without affecting its protective performance.

One means of coating surfaces with a metallic substance comprises sputter deposition. Sputter deposition results from the ionic bombardment of source target materials (metals) and subsequent ejection of atoms from these materials (metals) to form thin films on substrate surfaces. The ejected target atoms bombard the substrate surfaces at such high velocities that the resulting film is an atomic mixture of atoms from the target and substrate materials. The metal film will not usually separate from the substrate by flexing, heat, peeling or abrasion as might be expected of sprayed, electroplated or vapor deposited coatings.

Other plastic films also being coated with aluminum and sold commercially include Kapton, Surlyn, polystyrene, polypropylene and the like.

Other methods of aluminizing used in other applications include (1) the fabric being metallized by treating it with a metal pigmented coating, (2) thin metal film foil being laminated onto the fabric, and (3) transfer of the metal from a metallized film to a substrate (fabric) with a curable adhesive, and curing the adhesive. This technique is widely used for decorative applications in the metallized paper industry and has applications in the decorative fabric field. (The adhesive has to be acrylic for electron beam curing).

Most lamination processes are continuous "roll-to-roll" laminations with an adhesive followed by post curing and additional curing via a series of one or more sets of heated nip rolls. The actual lamination lines and the adhesives are considered proprietary. The adhesive systems utilized are usually fire resistant versions of polyurethanes, neoprene latexes, epoxies, polyimides and polyesters.

The fabrics currently used as the backing for AFCF are woven (plain weave, basket weave and 2×2 twill). These fabrics are predominantly Kevlar for the military with some Kevlar/PB1 (60/40).

In the specific application of reflective aluminized firefighter's coats, the aluminized Mylar film is laminated to strong, lightweight, fire resistant fabric. These coats function by reflecting about 90–92% of the spectral infra red (IR) light away from the body. In cases of petroleum fuel fires, about 75% of the heat is transferred by IR radiation to the firefighter. The aluminum film on the polyester (Mylar) is very flexible, but is very thin and prone to be abraded off or subject to delamination. The delamination is due to the absorption of the Mylar of water vapor or chemical solvents through the pin holes in the aluminum coating followed by loss of adhesion between the aluminum surface and the polyester film (Mylar). The aluminum is coated on both sides of the polyester film but as the outside coating is worn away, the IR energy passes through the layer of polyester film and is reflected back, passing through the film a second time. The film absorbs some of the IR energy and its temperature is raised. If the temperature of the polyester film exceeds 400° F. by much, the film melts and fails and the coat develops a hot spot with significant heat passing into the nominal insulative clothing which was not designed for this extra heat and the firefighter must leave the area before receiving burns.

There has been a continuing search to find an abrasion resistant coating which can extend the life time of these garments by protecting the outer aluminum layer from abrasion and delamination. Up to now, no such coating has been found which (1) increases the abrasion resistance of the aluminum film significantly in very thin coatings, more than double; (2) adheres to the metal surface (actually the surface is a thin aluminum oxide film over the aluminum) very well through flexing and immersion in hot water, and (3) is relatively transparent to IR and does not reduce the reflectivity of the aluminum film by more than 2.5%.

Attempts have been made to provide the protective clothing with coatings that will resist abrasion. U.S. Pat. No. 4,284,682 to Factor, et al discloses a flexible, flame retardant, abrasion resisting coating which comprises thermoplastic polyurethane and flame retardant additives that are placed on a fabric substrate. However, the coating cannot be utilized on metallized surfaces because of delamination.

U.S. Pat. No. 4,371,585 to Memon, which is herein incorporated by reference, discloses silicone or siloxane-based abrasion resistant coatings which are placed on a polycarbonate substrate which does not crease and flex as a fabric structure. Moreover, conventional silicone and siloxane compositions are usually not suitable by themselves for coating metal surfaces.

It is therefore an object of the invention to provide an abrasion and fire resistant coating on a metallized substrate which will not crack or delaminate.

It is another object of the invention to provide a coating on metallized protective clothing and fabrics which is non-burning/charring and can be utilized at high temperatures.

It is a further object of the invention to provide a coating on metallized protective clothing, fabrics and other substrates which is transparent.

It is yet a further object of the invention to provide substrates having a first primer coating and a second abrasion-resistant coating.

SUMMARY OF THE INVENTION

According to the invention, there is provided a means for applying a polysiloxane or silicone coating to a metallic substrate. More particularly, there is provided a transparent coating for lightweight metallic laminates and clothing having a metallized surface comprising silicone and polysiloxes which will not delaminate or craze, and the compositions for use therefore.

In accordance with one embodiment of the invention, there is provided a primer coating composition comprising a lanthanium salt and/or a phosphorous acid and/or chromic acid in a suitable solvent system. After the primer coating is applied, a suitable silicone or siloxane coating may be applied to form the abrasion resisting top coat. The primer coating composition of the invention is specifically formulated to cause good bonding of the abrasion resistant layer to the metallic surface.

In accordance with another embodiment of the invention, there is provided a laminated fire resistant, flexible fabric comprising a layer of woven or nonwoven fabric, a metallic layer, a primer layer, a silicone or siloxane layer, and optionally a waterproofing top coating.

DESCRIPTION OF THE PREFERRED EMBODIMENTS

In accordance with one embodiment of the invention, an aluminum coated fabric is provided for the manufacture of fire-proximity protective suits which has good abrasion resistance and flexibility. The base fabric may comprise woven and nonwoven fire resistant cotton, wool, oxidized polyacrylonitrile fiber (OPF), KEVLAR and NOMEX (trademarks of aramid fibers of E.I. duPont & Co.), polyether sulfone, polysulfone, polyimide, polyethylene terephthalalate (MYLAR) and the like, most preferable of the fabrics is the polyester MYLAR.

To prevent delamination and pin hole openings and to provide abrasion resistance, the aluminum layer is provided with a protective coating. The coating comprises a silicone or polysiloxane which preferably contains finely dispersed silica or other finely divided, transparent, non-absorbing metal oxides.

In order to achieve the objectives of the present invention it has been found that the use of a primer layer improves the adhesion of the coatings toward flexing and hot water. Advantageously, the primer forms an insoluble glassy acid coating or is formed by a lanthium containing salt solution.

The primer layer which has been found to be most effective comprises a phosphourous acid, such as phosphoric and phosphorous acids or chromic acid. The primer advantageously comprises an alcoholic solution of an acid forming an insoluble glassy acid coating layer. The glassy acid coating is formed by curing an acid which forms an insoluble layer such as phosphoric acid, phosphorous acid, chromic acid or mixtures thereof in an amount of about 0.25 to 10% by weight of composition, preferably about 0.5 to 2.0% by weight.

Any one of the lower alkanols can be utilized as the solvent, preferably, the secondary alcohols such as isopropanol.

The primer coat is applied to the substrate by an suitable means, e.g., spraying, brushing, dipping, etc. followed by drying.

The abrasion resistant coating is then applied to the primer layer and cured at elevated temperatures, preferably about 50° to 150° C.

The composition for forming the transparent abrasion resistant coating comprises about 3 to 20% by weight silicone or polysiloxane, about 1.5 to 10% by weight acetic acid, about 3 to 20% by weight silica and a lower alkanol, preferably isopropyl alcohol.

Suitable polysiloxanes which may be utilized to prepare the top coating composition of the invention are found in the brochure entitled "Dow Corning Materials For High Technology Applications", Dow Corning Corporation 1986, which is herein incoroporated by reference. Among those mentioned are the siloxanes of the formulas:

$(RO)_4$—Si, $CH_3$—Si—$(OR)_3$ and
$(CH_3)_2$—Si—$(OR)_2$ wherein R is an alkyl group of 1 to 6 carbon atoms.

If desired, the top coating composition may include U.V. absorbers such as 2,4-dihydroxy-benzophenone, 3:2-cyano-3-phenylethyl cinnamate, and the like.

The present invention is further illustrated by the following examples, but is not to be limited thereby. The amounts shown are all in percent by weight.

EXAMPLE 1

A. Preparation of Primer

A primer was prepared by adding 1 g. of lanthanum acetate and 1 g. of glacial acetic acid to 100 g. of isopropanol with high speed stirring. The mixture is filtered and applied to an aluminum substrate.

In lieu of acetic acid, there may be used 0.5% by weight of phosphorous acid or chromic acid.

EXAMPLE 2

A. Preparation of Primer

A primer was prepared by adding 1 g. of lanthanum acetate, 0.5 g. of glacial acetic acid and 0.5 g. of phosphorous acid to 100 g. of isopropanol with high speed stirring. The mixture is filtered and applied to an aluminum substrate.

EXAMPLE 3

A. Preparation Of Abrasion Resistant Coating

A coating composition was prepared with the following ingredients:

33.3 parts water 0.62 parts $NaOAc.3H_2O$ 50.0 parts colloidal silica, 60 millimicron 2.5 parts glacial acetic acid 46.7 parts methyl trimethoxysilane 4.8 parts dimethyl dimethoxysilane, diluted to 20% solids with isopropanol and aged 6 days before application.

EXAMPLE 4

A. Preparation Of Primer

A primer was prepared by dissolving 1.0 g. of phosphoric acid in 100 ml. of isopropanol.

B. Preparation Of Coating

A one foot square of aluminized MYLAR was coated by brushing on one side the primer from Part A. The coating was air dried and placed in an oven at 150° C. for six minutes. The coated fabric was then brush coated with the coating composition of Example 3. The coating was dried at ambient temperature overnight.

The resulting top coat could not be chipped when scratched with

The resulting top coat could not be chipped when scratched with a fingernail.

If desired, a waterproofing aftercoat may be applied with a composition of the following formula:

101 g. isopropanol 6.5 g. carboset 525

3.5 g. CY179

0.2 g. toluene sulfonic acid.

EXAMPLE 5

A top coating composition was prepared as follows:

75 g. silica sol (LUDOX)

4 g. tetramethoxysilane 55 g. methyltrimethoxysilane 8 g. dimethyldiethoxy silane 0.5 g. U.V. inhibitor 750 g. isopropanol 3 g. acetic acid

What is claimed is:

1. A process for applying and adhering an abrasion resistant silicone or siloxane coating to a metallized substrate comprising applying a primer coating comprising a member selected from the group consisting of phosphoric acid, phosphorous acid, chromic acid and a lanthium salt dissolved in a suitable solvent, heating and then applying said abrasion-resistant coating.

2. The process of claim 1 wherein said primer comprises phosphorous acid and a hard, glassy, water-insoluble coating is formed upon heating.

3. The process of claim 1 wherein said primer comprises chromic acid and a hard, glassy, water-insoluble coating is formed upon heating.

4. Articles produced by the process of claim 3.

5. The process of claim 1 wherein said metal is aluminum.

6. The process of claim 1 wherein said primer comprises lanthium laurate and isopropanol.

7. The process of claim 1 wherein said abrasion resistant coating includes a U.V. absorber.

8. Articles produced by the process of claim 7.

9. The process of claim 1 wherein said polysiloxane comprises a compound of the formula: $(RO)_4$—Si, $CH_3$—Si—$(OR)_3$ and $(CH_3)_2$—Si—$(OR)_2$ wherein R is an alkyl group of 1 to 6 carbon atoms.

10. Articles produced by the process of claim 9.

11. The process of claim 1 wherein said metallized substrate is an aluminum coated fabric.

12. Articles produced by the process of claim 1.

13. The article of claim 12 which is metallized fabrics.

14. A flexible, abrasion resistant, flame retardant, coated fabric, which fabric comprises a fabric layer, an aluminum layer adhering to said fabric layer, a prime coating comprising a member selected from the group consisting of phosphoric acid, phosphorous acid, chromic acid and a lanthium salt and an abrasion resistant polysiloxane coating adhering to said aluminum layer.

15. The coated fabric of claim 14 wherein said fabric is polyethylene terephthalate.

* * * * *